US012573101B2

(12) United States Patent
Tran et al.

(10) Patent No.: US 12,573,101 B2
(45) Date of Patent: Mar. 10, 2026

(54) TECHNIQUES FOR IMPROVING RENDERING SPEED OF AVATAR COSTUMES IN ONLINE VIRTUAL ENVIRONMENTS

(71) Applicant: NetEase Information Technology Corporation, Pasadena, CA (US)

(72) Inventors: Ray Tran, London (GB); Ross Alan Gardner, Irvine, CA (US); John Elliot Meier, Bothell, WA (US); Andreas Mantler, Reading (GB); Brian Allen Neal, Los Angeles, CA (US)

(73) Assignee: NetEase Information Technology Corporation, Pasadena, CA (US)

( * ) Notice: Subject to any disclaimer, the term of this patent is extended or adjusted under 35 U.S.C. 154(b) by 200 days.

(21) Appl. No.: 18/587,641

(22) Filed: Feb. 26, 2024

(65) Prior Publication Data

US 2025/0272884 A1 Aug. 28, 2025

(51) Int. Cl.
G06T 11/00 (2006.01)
G06F 12/0813 (2016.01)

(52) U.S. Cl.
CPC .......... G06T 11/00 (2013.01); G06F 12/0813 (2013.01); *G06F 2212/263* (2013.01); *G06T 2200/24* (2013.01)

(58) Field of Classification Search
CPC . G06T 11/00; G06T 2200/24; G06F 12/0813; G06F 2212/263
See application file for complete search history.

(56) References Cited

U.S. PATENT DOCUMENTS

| | | | |
|---|---|---|---|
| 2018/0122139 A1* | 5/2018 | Janzer | A63F 13/63 |
| 2020/0126275 A1* | 4/2020 | Moroze | G06T 11/20 |
| 2022/0319075 A1* | 10/2022 | Hu | H04L 51/10 |
| 2023/0360345 A1* | 11/2023 | Joudrey | G06T 13/40 |
| 2025/0131669 A1* | 4/2025 | Carter | G06T 17/20 |

* cited by examiner

*Primary Examiner* — Daniel F Hajnik
*Assistant Examiner* — Thomas John Foster
(74) *Attorney, Agent, or Firm* — Hickman Becker Bingham Ledesma LLP

(57) ABSTRACT

Customized costume caching techniques are provided in which the combined meshes are pre-computed for only a small subset of all possible customized costumes (the "high-likelihood costumes"). Newly created customized costume may automatically qualify as high-likelihood costumes. The combined mesh for high-likelihood costume may be provided from the cloud-based costume cache to any client application that needs to render an avatar that corresponds to the customized costume, without having to perform any on-the-fly combination of the mesh information of the individual costume components. The cloud-based costume cache may be used in conjunction with local costume caches, where the criteria for being stored in a local costume cache is likelihood of display on the corresponding device, while the criteria for being stored in the cloud-based costume cache is likelihood of being displayed by any device on the platform.

21 Claims, 3 Drawing Sheets

TECHNIQUES FOR IMPROVING RENDERING SPEED OF AVATAR COSTUMES IN ONLINE VIRTUAL ENVIRONMENTS

FIELD OF THE INVENTION

The present invention relates to online virtual environments and, more specifically, to online virtual environments populated by avatars that have customizable costumes.

BACKGROUND

Platforms that implement online virtual environments frequently allow users to customize the appearance of avatars. In many situations, such as online gaming environments, the avatars are controlled by the users. In other situations, the avatars may be controlled by the system. Many users, such as players in multi-player online games, find designing unique and impressive costumes for their avatars to be one of the most enjoyable aspects of online gaming.

As used herein, the term "costume" refers not only to the clothing/armor worn by an avatar, but to anything that affects the appearance of an avatar. Thus, a costume includes features such as the type and shape of body parts (face, nose, ears, hands, etc.), race, class, body shape, auras, weapons, backpacks, hairstyle, etc. The visual features that collectively constitute the costume of an avatar are referred to herein as "costume components".

Unfortunately, supporting a high degree of costume customization has the downside of having to maintain mesh information for every costume component, and having to combine the mesh information for all costume components of an avatar in order to render the image of the avatar. Combining the mesh information for all costume components of an avatar involves a significant amount of computational resources.

For example, assume that player A teams up with player B on a mission within a virtual environment of a game. Assume further that player B's avatar has a customized costume comprised of 50 distinct costume components. In order for player A's device to render the avatar of player B, the mesh information for all 50 costume components of player B's avatar may be sent to the computing device of player A. Player A's computing device can only accurately render player B's customized avatar after the mesh information for those costume components have been combined.

Whether the on-the-fly combination of the meshes of the costume components of a customized costume is performed on the client device or in the cloud, the need to perform such on-the-fly combination operations creates significant overhead, which is experienced by the users of the platform as latency. The overhead associated with rendering customized avatars becomes even more problematic the larger the number of avatars that are seen simultaneously by any given player. For example, rather than teaming up with one other player, player A may team up with 40 other players. Under these circumstances, player A's computing device (or the cloud) may need to perform an on-the-fly combination of the mesh information for 50 distinct costume components for each of the 40 other players to enable player A to see the customized avatars of the other players.

One technique for avoiding the need to combine mesh information on-the-fly every time a customized avatar needs to be displayed is to pre-generate combined mesh information for all possible customized costumes (i.e. all possible permutations of costume components). Once combined meshes for all possible customized costumes are pre-generated, when a customized avatar needs to be rendered, the pre-generated mesh for the customized costume of the avatar can simply be retrieved and sent to the appropriate computing device.

Unfortunately, when avatars have a large number of customizable costume components, and each costume component can be customized in a large number of ways, pre-generating combined mesh information for every possible customized costume quickly becomes impractical. Depending on the degree of customization permitted, the number of possible distinct customized costumes is virtually endless. Pre-generating and storing mesh information for so many potential costumes is wasteful of both storage space and computing resources, since a very small percentage of the possible costumes will ever actually be used.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Rather than combine the mesh information of an avatar's costume components on-the-fly, the mesh information for customized costumes is pre-computed. The mesh information produced by combining the mesh information of the costume components of a customized costume is referred to herein as the "combined mesh" of the customized costume.

Rather than precompute the combined meshes for every possible customized costume (which is practically impossible for platforms that offer a high degree of customization), the combined meshes are pre-computed for only a small subset of all possible customized costumes. The subset of customized costumes for which combined meshes are pre-computed is referred to herein as the "high-likelihood costumes". High-likelihood costumes are customized costumes that are more likely to be rendered/displayed than customized costumes that are not high-likelihood costumes.

In one implementation, every customized costume is initially categorized as a high-likelihood costume at the time the customized costume is created. In such an implementation, a user may be presented with controls that allow the user to select and modify costume components of the user's avatar. The user may also be presented with a control to indicate when the user is done with the avatar customization process (e.g. a "save costume" button). In response to activation of the control, the permutation of costume components that is currently selected by the user becomes a high-likelihood costume, and a combined mesh for the costume is generated and stored in a cloud-based costume-cache. Once saved in the cloud-based costume-cache, the combined mesh for the customized costume may be provided to any client application that needs to render an avatar that corresponds to the customized costume, without having to perform any on-the-fly combination of the mesh information of the individual costume components.

Customized costumes remain high-likelihood costumes as long as they meet certain criteria. The criteria may be, for example, that the costumes are used more frequently, or more recently, than other customized costumes. As another example, the criteria may be that the "ratings" for the customized costume exceeds a certain threshold. Once a customized costume ceases to satisfy the criteria, the combined mesh for the costume may be flushed from the cloud-based costume cache to make room for the combined meshes of new high-likelihood costumes.

System Overview

Figure 1:
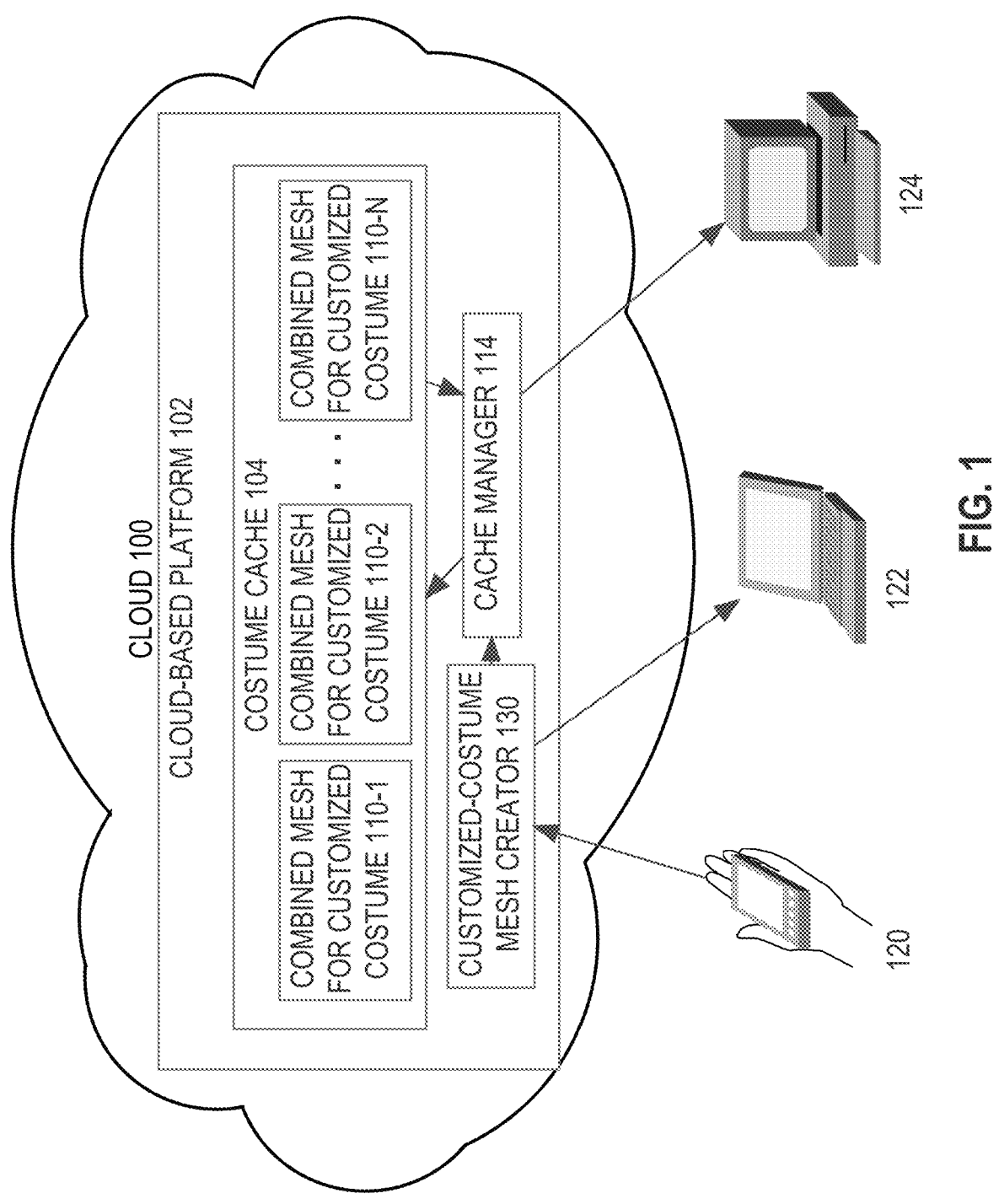
FIG. 1 is a block diagram of a cloud-based platform that implements a cloud-based costume cache, according to an implementation.

FIG. 1 is a block diagram of a cloud-based platform 102 that implements a cloud-based costume cache 104 according to one implementation. Referring to FIG. 1, cloud-based platform 102 generally represents any platform that implements a virtual environment in which users can see the customized costumes of avatars associated with other users. In the illustrated embodiment, cloud-based platform 102 is executing on cloud 100. For the purpose of explanation, it shall be assumed that cloud-based platform 102 is a gaming platform that allows users to customize the costumes of their avatars.

Each user connects to the gaming platform using a client device (e.g. client devices 120, 122, and 124). As illustrated in FIG. 1, the client devices may take many forms, including smart phones, tablets, laptops, game consoles and desktop computers. For example, depending on the game in question, the game platform may be limited to smart phones, game consoles, or desktop computers, or may support any mixture thereof. The costume-caching techniques described herein are not limited to any specific type or mixture of client devices.

Cloud-based platform 102 includes costume cache 104, a cache manager 114, and a customized-costume mesh creator 130. Customized-costume mesh creator 130 generally represents the cloud-based computing components used to generate combined meshes for customized costumes. In one implementation, customized-costume mesh creator 130 receives as input the identifiers of all costume components that were selected for a given customized costume. Using the identifiers of the selected costume components, the customized-costume mesh creator 130 retrieves the combined meshes for each of the selected individual costume components, and based on the mesh information of the selected individual costume components, generates as output a combined mesh for the customized costume.

In an alternative implementation, the operation of combining the meshes of costume components to create combined meshes of customized costumes may be performed on the client devices that are used to create the customized costumes. In such an implementation, the cloud-based platform 102 would receive, from the client devices, the combined meshes themselves rather than identifiers of the costume components of the customized costumes.

Cache manager 114 generally represents those cloud-based computing devices that are used to store combined meshes in costume cache 104, retrieve combined meshes from costume cache 104, and flush combined meshes from costume cache 104 when necessary to make room for new combined meshes. In the system illustrated in FIG. 1, costume cache 104 currently stores N combined meshes (for customized costumes 110-1 to 110-N).

Maintaining the Cloud-Based Costume-Cache

In one implementation, costume cache 104 has a maximum size that may be far smaller than is necessary to store combined meshes for all customized costumes that are created by users. If the combined mesh for a new high-likelihood costume needs to be stored and the costume cache 104 is already full, then cache manager 114 replaces one or more combined meshes that are currently in the costume cache 104 with the combined mesh of the new high-likelihood costume. In one implementation, the combined meshes that are replaced are chosen by cache manager 114 on a least-recently-used basis. In such an implementation, cloud-based platform 102 would include a mechanism for tracking how recently each combined mesh in costume cache 104 is used, such as most-recent-use timestamps.

Alternatively, the combined meshes that are replaced may be chosen by cache manager 114 on a least-frequently-used basis. In such an implementation, cloud-based platform 102 would include a mechanism for tracking how frequently each combined mesh in costume cache 104 is used, such maintaining a running count of uses of each cached combined mesh within a most recent time interval (e.g. within the last 7 days).

The criteria for retaining a combined mesh in the costume cache 104 may include other factors as well. For example, in platforms where multiple avatars are able to share the same customized costume, the criteria may take into account how many avatars are sharing the customized costume that corresponds to each combined mesh. As another example, the criteria may be based on "ratings" that users (or an algorithm) has given to each customized costume that corresponds to a combined mesh stored in the costume cache 104.

OPERATIONAL EXAMPLE

As explained above, in one implementation, a customized costume is initially treated as a high-likelihood costume at the time the customized costume is created. For example, assume that the user of device 120 designs a customized costume by selecting costume components 1 to 25. In response to the user selecting a control to indicate that the user has finished designing the customized costume, information that identifies the selected costume components (costume components 1 to 25) is sent to customized-costume mesh creator 130. Customized-costume mesh creator 130 retrieves the mesh information for each of costume components 1-25, and generates a combined mesh for the customized costume. The combined mesh for the customized costume is sent to cache manager 114, which causes the combined mesh for the customized costume to be stored in costume cache 104. In one implementation, additional meta-data may be stored in conjunction with the combined mesh, such as an identifier of the avatar associated with the customized costume, an identifier of the user associated with the avatar, identifiers of the costume components used to create the combined mesh, a creation timestamp, a most recent use timestamp, etc.

If the user that created the customized costume is teamed with one or more other players at the time the customized costume is created, then the combined mesh for the custom-ized costume may be sent directly to the client devices of those other players by the customized-costume mesh creator 130. FIG. 1 illustrates the combined mesh of a customized costume being sent from customized-costume mesh creator 130 to user device 122.

If the user that created the customized costume teams with players using that same avatar/costume at any later time, as long as the combined mesh for the customized costume for the avatar is still in costume cache 104, the combined mesh for the customized costume is sent from costume cache 104 to the client devices (e.g. client device 124) of those other players, thereby avoiding the need for any on-the-fly com-bination of costume component mesh information.

If the combined mesh for a given customized costume has been removed from the costume cache 104 (e.g. because the avatar associated with the customized costume has not been used for a long time), then a new use of the avatar associated with the customized costume may cause the combined mesh for the customized costume to be generated by customized-costume mesh creator 130 once again, and then stored in the costume cache 104.

Costume-Download-Triggering Events

As discussed above, the combined mesh for a customized costume is downloaded from cloud-based platform 102 to a user's client device in response to an event that requires the customized costume to be displayed. In the context of a team game, the costume-download-triggering event may be join-ing a team that includes an avatar that corresponds to a customized costume. As another example, the costume-download-triggering event may be entering a region of a virtual environment that is occupied by avatars that have customized costumes. Costume-download-triggering events may vary from implementation to implementation, and the costume caching techniques described herein are not limited to any particular types of costume-download-triggering events.

In one implementation, a costume-download-triggering event may be the creation of a new costume by a friend of the user. For example, assume that the user of device 120 is a friend of the user of device 124. In response to the creation of a new customized costume on device 120, in addition to being stored in costume cache 104, the combined mesh for the new costume may be automatically downloaded to device 124. By downloading the customized costumes of friends at costume-creation time, no time need be spent downloading the customized costumes when the user of device 124 teams with the user of device 120.

Customized Costume Cloning

A costume-download-triggering event may also be trig-gered by a control in the costume design interface. For example, when presenting a costume design interface, a client application may present the user with the option of viewing certain sets of existing costumes. Consider a plat-form that provides a mechanism for rating customized costumes (either with user-specified ratings or automati-cally-generated ratings). In such a platform, the costume design interface may provide a mechanism for downloading the combined meshes of the top 10 ranked customized costumes. The user may then select one of those costumes, effectively cloning it for use by the user's own avatar. Once cloned, the user may make further changes to the costume to individually customize it to the user's tastes.

Similarly, upon clicking on the avatar of any other player, the user may be presented with the option of specifying that the customized costume of the avatar is a "favorite". In such an implementation, the costume design interface may pres-ent the user with the option of viewing the user's designated "favorite" costumes. In response to selection of this option, the client application of the user may download and display the combined meshes of all customized costumes that the user has designated as favorites. Any one of these costumes may be cloned and used as the basis for creating a new customized costume, as described above.

Local Costume Caches

Figure 2:
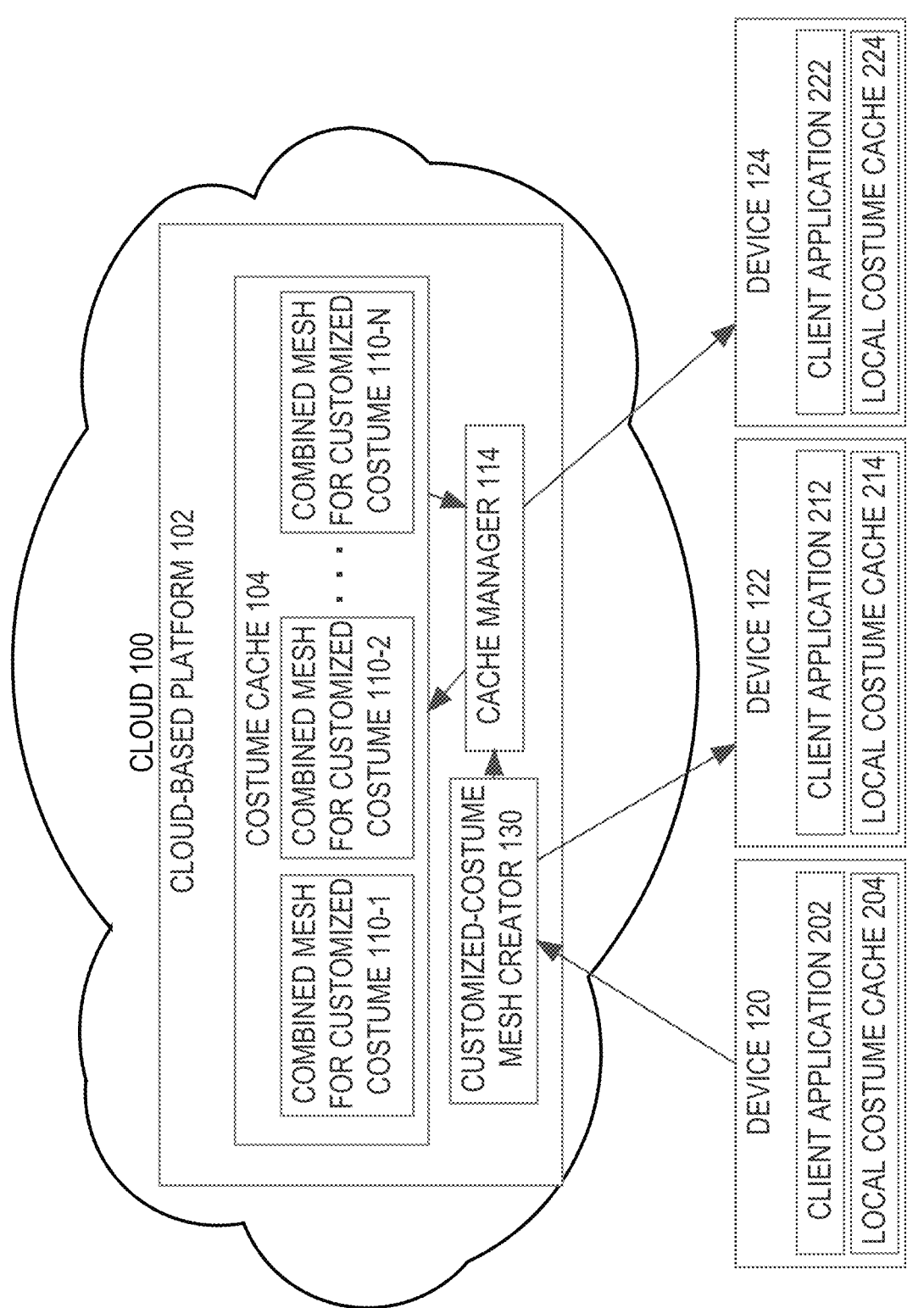
FIG. 2 is a block diagram of the cloud-based platform of FIG. 1 in which client devices maintain local costume caches, according to an implementation.

In one implementation, client devices may implement their own local costume caches. Referring to FIG. 2, it illustrates the system of FIG. 1 where each of the client devices 120, 122 and 124 maintains its own local costume cache. Specifically, device 120 is executing client applica-tion 202 which interacts with cloud platform 102, renders a display of the virtual environment including customized costumes of avatars seen by the user of device 120, and manages local costume cache 204. Device 122 is executing client application 212 which interacts with cloud platform 102, renders a display of the virtual environment including customized costumes of avatars seen by the user of device 122, and manages local costume cache 214. Device 124 is executing client application 222 which interacts with cloud platform 102, renders a display of the virtual environment including customized costumes of avatars seen by the user of device 124, and manages local costume cache 224.

In one implementation, local costume caches are config-ured to store the combined meshes of the customized costumes that are most likely to be seen by the users of the devices on which the local caches reside. For example, local costume cache 204 may be configured to store the combined meshes of the customized costumes that are most likely to be displayed to the user of device 120. In this context, "most likely to be displayed" may be determined by recency of the display of the customized costume on device 120, frequency of display of the customized costume on device 120, or by some other factors. Another factor may be, for example, frequency of teaming between users. Thus, a customized costume that is created by a user with whom the user of device 120 frequently plays may automatically qualify as a customized costume that is likely to be displayed by the user of device 120, even before the customized costume is ever actually displayed by device 120.

Significantly, the customized costumes that are most likely to be displayed by an individual device (and therefore be stored in the local cache of the individual device) may differ from the high-likelihood costumes stored in costume cache 104. For example, assume that a particular user plays an online game infrequently, but when she does play, she always plays with the user of device 120. Under these circumstances, a customized costume made by the particular user may be stored in local costume cache 204, but may not qualify as a high-likelihood costume to be stored in cloud-based costume cache 104.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
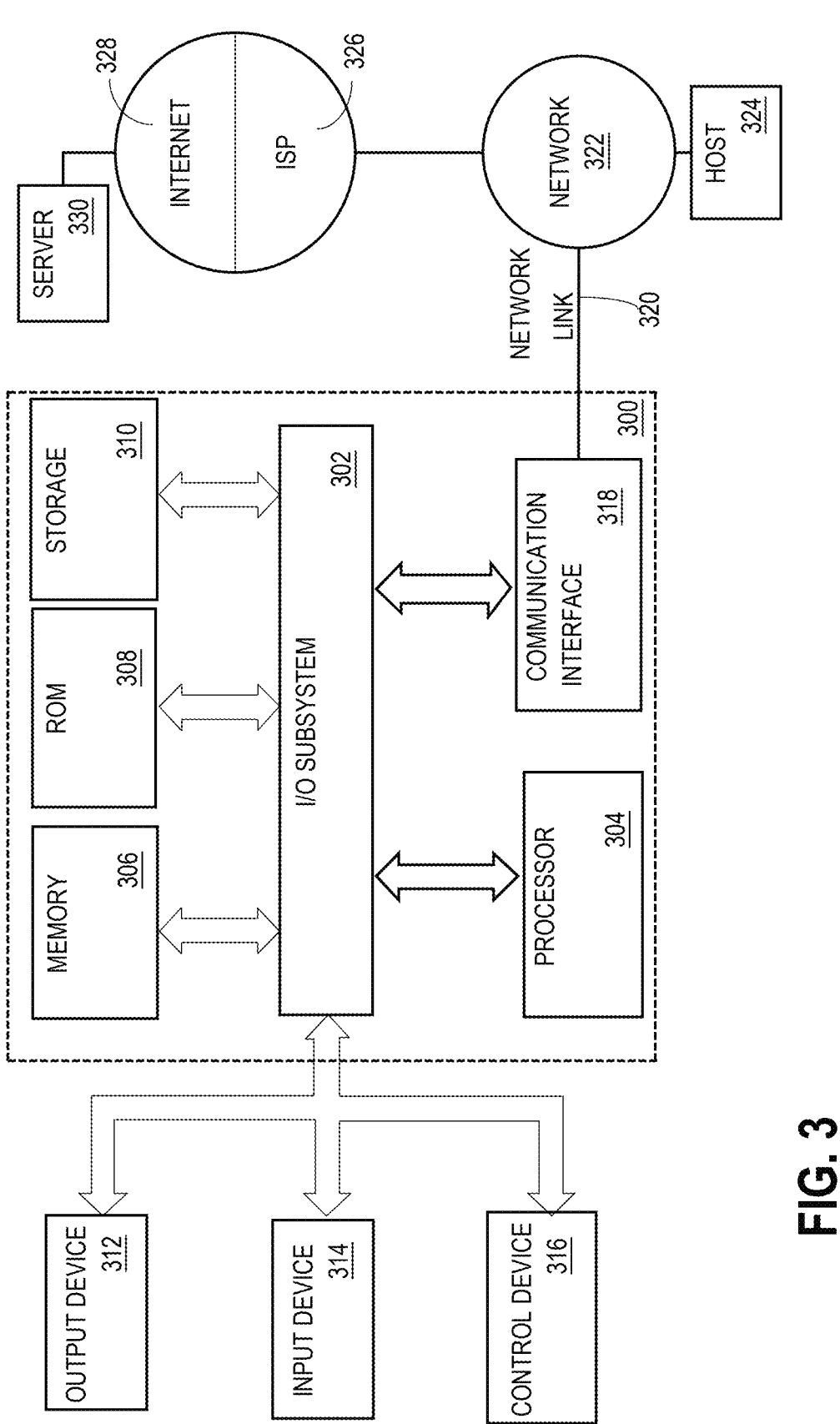
FIG. 3 is a block diagram of a computer system upon which the costume-caching techniques described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

providing, by a cloud-based platform:

a virtual environment that includes avatars whose appearance is based on customized costumes; and user interface controls that enable users to create customized costumes for avatars for the virtual environment by selecting combinations of costume components;

creating a combined mesh for each costume in a set of high-likelihood costumes;

wherein the set of high-likelihood costumes is a subset of all customized costumes that can be created using the user interface controls;

wherein the combined mesh for each costume in the set of high-likelihood costumes is created by combining meshes of all costume components that were selected by a user for the costume;

storing, in a cloud-based costume cache of the cloud-based platform, the combined mesh for each costume in the set of high-likelihood costumes; and in response to a costume-download-triggering event, causing the combined mesh for a particular high-likelihood costume to be sent from the cloud-based costume cache to a particular client device, of a particular user, that is connected to the cloud-based platform, without performing any on-the-fly combination of meshes of the costume components of the particular high-likelihood costume.

2. The method of claim 1 wherein:

the particular client device to which the combined mesh is downloaded is a first client device; and the method further comprises:

creating the combined mesh for the particular high-likelihood costume in response to a given user using the user interface controls on a second client device that is different from the first client device, and causing the combined mesh for the particular high-likelihood costume to be stored in the cloud-based costume cache in response to creation of the combined mesh for the particular high-likelihood costume.

3. The method of claim 2 wherein:

the given user has a particular relationship to the particular user within the cloud-based platform; and the costume-download-triggering event is creation of the combined mesh for the particular high-likelihood costume by the given user.

4. The method of claim 3 wherein the particular relationship is that the given user frequently teams with the particular user in the virtual environment provided by the cloud-based platform.

5. The method of claim 2 wherein the costume-download-triggering event is the particular user joining a team that includes the given user.

6. The method of claim 1 wherein the costume-download-triggering event is the particular user entering a region of the virtual environment that includes an avatar whose appearance is based on the particular high-likelihood costume.

7. The method of claim 1 further comprising flushing one or more combined meshes from the cloud-based costume cache prior to storing the particular high-likelihood costume in the cloud-based costume cache.

8. The method of claim 7 wherein flushing one or more combined meshes includes selecting the one or more combined meshes to flush from the cloud-based costume cache based on recency of use or frequency of use relative to other combined meshes in the cloud-based costume cache.

9. The method of claim 1 further comprising selecting one or more combined meshes to be stored in the cloud-based costume cache based, at least in part, on ratings given to one or more customized costumes that correspond to the one or more combined meshes.

10. The method of claim 1 further comprising enabling the particular user to create a new customized costume for an avatar of the particular user using the particular high-likelihood costume as a starting point for costume customization.

11. The method of claim 1 further comprising:

maintaining, at each of a plurality of client devices that connect to the cloud-based platform, a local costume cache; and wherein maintaining the local costume cache includes:

maintaining, on the particular client device, a particular local costume cache; and storing the combined mesh for the particular high-likelihood costume in the particular local costume cache in response to the combined mesh for the particular high-likelihood costume being downloaded to the particular client device.

12. The method of claim 11 further comprising retaining the combined mesh for the particular high-likelihood costume in the particular local costume cache after the combined mesh for the particular high-likelihood costume has been flushed from the cloud-based costume cache.

13. The method of claim 11 wherein the costume-download-triggering event:

is creation of the combined mesh for the particular high-likelihood costume by a given user that has a particular relationship with the particular user; and causes the combined mesh of the particular high-likelihood costume to be stored in the particular local costume cache before any event that would cause the particular client device to display the particular high-likelihood costume.

14. One or more non-transitory computer-readable media storing instructions which, when executed by one or more computing devices, cause:

providing, by a cloud-based platform:

a virtual environment that includes avatars whose appearance is based on customized costumes; and user interface controls that enable users to create customized costumes for avatars for the virtual environment by selecting combinations of costume components;

creating a combined mesh for each costume in a set of high-likelihood costumes;

wherein the set of high-likelihood costumes is a subset of all customized costumes that can be created using the user interface controls;

wherein the combined mesh for each costume in the set of high-likelihood costumes is created by combining meshes of all costume components that were selected by a user for the costume;

storing, in a cloud-based costume cache of the cloud-based platform, the combined mesh for each costume in the set of high-likelihood costumes; and in response to a costume-download-triggering event, causing the combined mesh for a particular high-likelihood costume to be sent from the cloud-based costume cache to a particular client device, of a particular user, that is connected to the cloud-based platform, without performing any on-the-fly combination of meshes of the costume components of the particular high-likelihood costume.

15. The one or more non-transitory computer-readable media of claim 14 wherein:

the particular client device to which the combined mesh is downloaded is a first client device; and the instructions include instructions for:

creating the combined mesh for the particular high-likelihood costume in response to a given user using the user interface controls on a second client device that is different from the first client device, and causing the combined mesh for the particular high-likelihood costume to be stored in the cloud-based costume cache in response to creation of the combined mesh for the particular high-likelihood costume.

16. The one or more non-transitory computer-readable media of claim 15 wherein:

the given user has a particular relationship to the particular user within the cloud-based platform; and the costume-download-triggering event is creation of the combined mesh for the particular high-likelihood costume by the given user.

17. The one or more non-transitory computer-readable media of claim 16 wherein the particular relationship is that the given user frequently teams with the particular user in the virtual environment provided by the cloud-based platform.

18. The one or more non-transitory computer-readable media of claim 14 further comprising selecting one or more combined meshes to be stored in the cloud-based costume cache based, at least in part, on ratings given to one or more customized costumes that correspond to the one or more combined meshes.

19. The one or more non-transitory computer-readable media of claim 14 further comprising enabling the particular user to create a new customized costume for an avatar of the particular user using the particular high-likelihood costume as a starting point for costume customization.

20. The one or more non-transitory computer-readable media of claim 14 further comprising:

maintaining, at each of a plurality of client devices that connect to the cloud-based platform, a local costume cache; and wherein maintaining the local costume cache includes:

maintaining, on the particular client device, a particular local costume cache; and storing the combined mesh for the particular high-likelihood costume in the particular local costume cache in response to the combined mesh for the particular high-likelihood costume being downloaded to the particular client device.

21. The one or more non-transitory computer-readable media of claim 20 further comprising retaining the combined mesh for the particular high-likelihood costume in the particular local costume cache after the combined mesh for the particular high-likelihood costume has been flushed from the cloud-based costume cache.

* * * * *